United States Patent [19]

Parker

[11] 4,246,655
[45] Jan. 20, 1981

[54] CIRCUIT FOR PROVIDING AN INDICATION OF SIGNAL/NOISE RATIO IN A SELECTOR DIVERSITY SYSTEM

[76] Inventor: Bernhard D. Parker, c/o Dollman Electronics Limited, Biggin Hill Airport, Westerham, Kent, TN16 3BN, England

[21] Appl. No.: 949,406

[22] Filed: Oct. 10, 1978

[30] Foreign Application Priority Data

Oct. 18, 1977 [GB] United Kingdom ............ 43284/77

[51] Int. Cl.$^2$ ..................... H04B 1/16; H04B 17/00
[52] U.S. Cl. ................... 455/135; 324/57 N; 455/226; 455/303
[58] Field of Search ............ 325/304, 363, 476–478, 325/305, 67; 307/355; 324/57 N

[56] References Cited

U.S. PATENT DOCUMENTS

| 3,076,939 | 2/1963 | Wycoff | 325/478 |
| 3,213,372 | 10/1965 | Kurvits | 325/478 |
| 3,882,405 | 5/1975 | Tajima et al. | 307/355 |

Primary Examiner—Marc E. Bookbinder
Attorney, Agent, or Firm—Roylance, Abrams, Berdo & Farley

[57] ABSTRACT

A circuit for providing an indication of the signal/noise ratio of a single frequency signal as received by a receiver has first and second signal paths extending from its input to a comparator contained in the circuit. The first signal path includes a narrow band-pass filter, while the second signal path includes a notch filter. Means are provided in each signal path, for integrating the output of the respective filter. The comparator compares the outputs of the integrating means and outputs when the output of the first signal path integrating means is equal to or greater than the output of the second signal path integrating means. The time which elapses between the receipt of the signal at the input and the beginning of the comparator's output provides an indication of the signal/noise ratio. Such circuits can be used in selecting receivers in multi-receiver arrangements.

5 Claims, 3 Drawing Figures

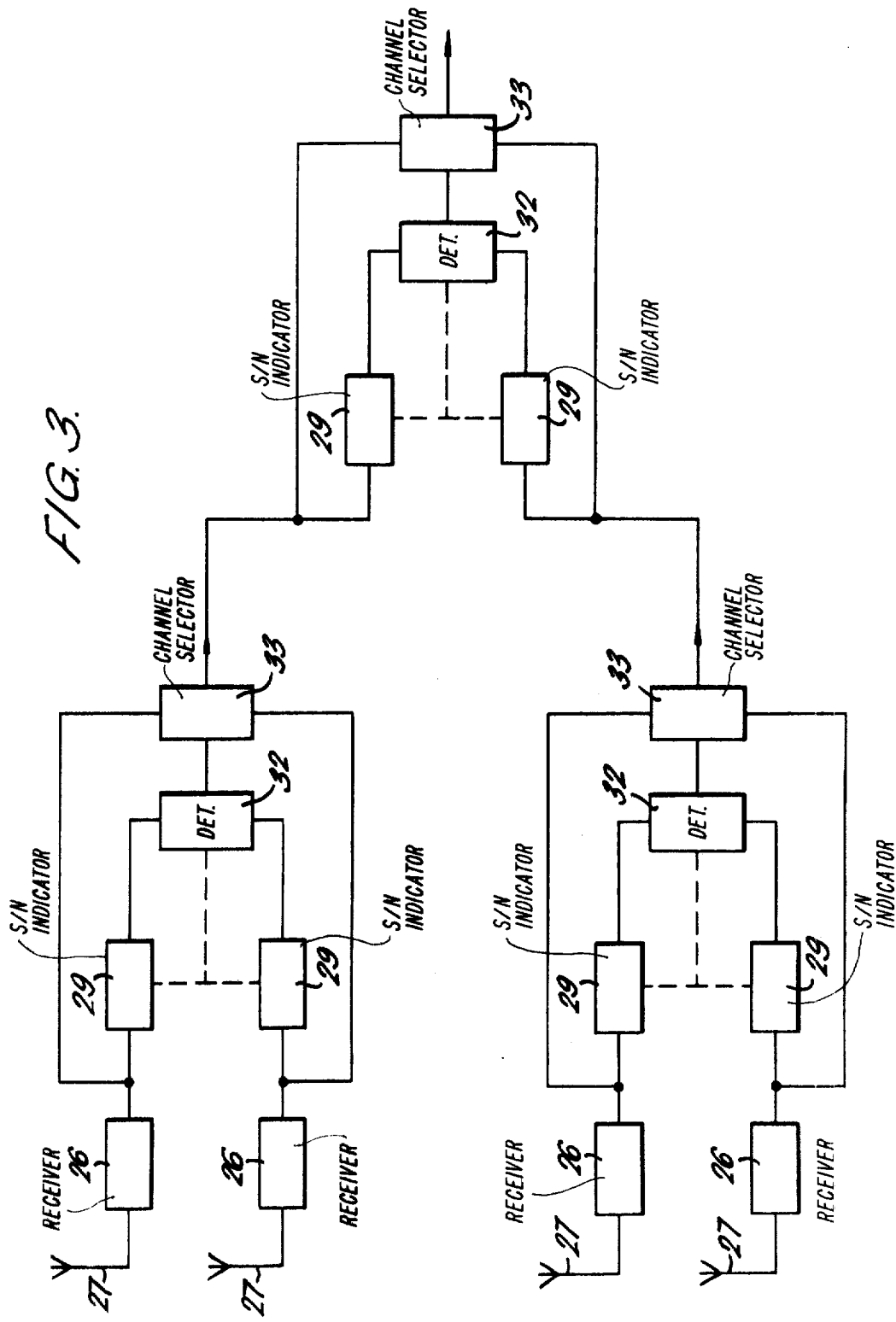

CIRCUIT FOR PROVIDING AN INDICATION OF SIGNAL/NOISE RATIO IN A SELECTOR DIVERSITY SYSTEM

FIELD OF INVENTION

This invention relates to a circuit for providing an indication of signal/noise ratio.

SUMMARY OF INVENTION

According to the present invention there is provided a circuit for providing an indication of the signal/noise ratio of a single frequency signal as received by a receiver comprising:

input means for the received signal;
comparator; and
first and second signal path means extending between the input means and the comparator; the first signal path including narrow band-pass filter means tuned to the signal frequency and means for integrating the output of the band-pass filter means, the second signal path includes notch filter means tuned to the signal frequency and means for integrating the output of the notch filter means and the comparator being constituted by means for providing an output whenever the integrated output on the first signal path is equal to or greater than the integrated output on the second signal path whereby the time that elapses between the receipt of the signal at the input and the beginning of the comparator's output provides an indication of the signal/noise ratio.

Preferably the circuit further comprises an amplifier connected in the first and second signal paths between the input and the filter means for amplifying the received signals to a common level.

The circuit may further comprise means for setting a D.C. voltage level in the second signal path.

According to an aspect of the invention there is provided apparatus for selecting one of a plurality of receivers comprising a circuit as hereinbefore defined for each receiver, means for detecting which circuit outputs first and means for selecting the receiver associated with the first circuit to output.

The means for detecting may comprise two or more means for determining which of a respective group of receivers outputs first and further means for determining which of the first mentioned means for determining is first to detect an output.

If the apparatus is used with a number of dispersed receivers such that the signals arrive at the inputs of the circuits at different times due to line delays the detecting means may be arranged to clamp and then release all the circuits in response to the detection of the first output and to select the receiver associated with the first circuit to output after the circuits have been clamped and released subsequently.

Specific embodiments will now be described with reference to the accompanying drawings in which:

FIG. 3 is a block diagram of an alternate multi-receiver apparatus.

Figure 1:
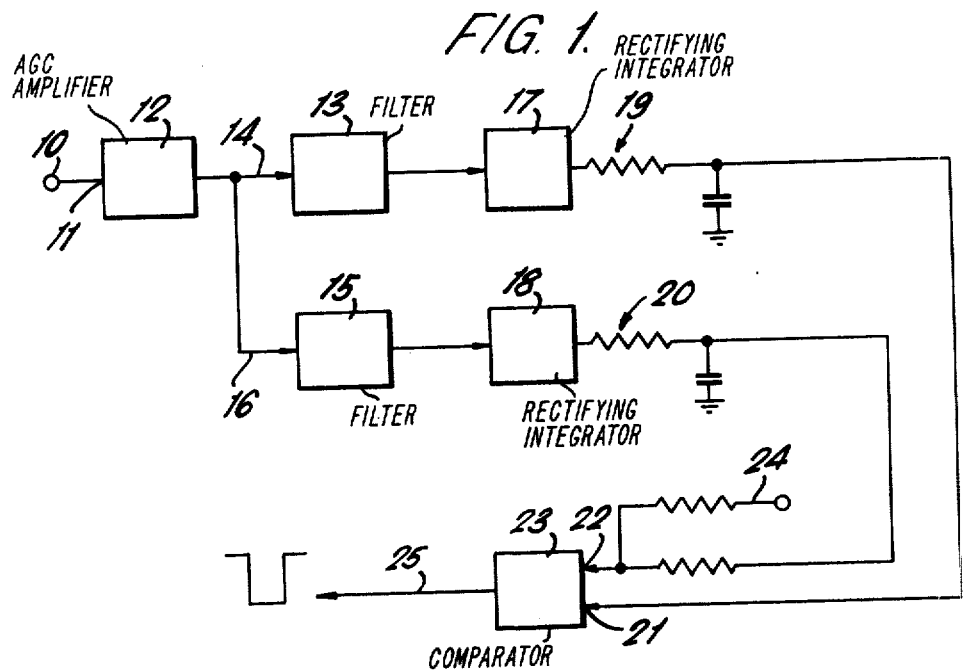
FIG. 1 is a circuit diagram of a circuit for providing an indication of the signal/noise ratio.

Referring to FIG. 1 an audio frequency input 10 is connected to the input 11 of an automatic gain control amplifier 12, the output of which is fed to a band-pass filter 13 via line 14 and a notch filter 15 by line 16. The outputs of the filters 13 and 15 are fed via respective rectifying integrators 17 and 18 and smoothing circuits 19 and 20 to respective inputs 21 and 22 of a comparator 23. A.D.C. voltage reference can be introduced to input 22 of the comparator 23 on line 24.

The comparator 23 is arranged to output on its output line 25 only when the voltage level at its input 21 is equal to or more positive than the voltage level at its input 22.

In use a transmitted single frequency signal or tone signal and its associated noise via the input 10, are simultaneously fed along a first signal path defined by the amplifier 12, band-pass filter 13, integrator 17 and smoothing circuit 19 and a second signal path defined by the amplifier 12, notch filter 15, integrator 18 and smoothing circuit 20 to respective inputs 21 and 22 of the comparator 23.

The amplifier 12 amplifies all received signals to a common level so that its peak output voltage is independent of the frequency of the tone signal and of the noise. The amplified tone signal and noise is fed, in the first signal path, through the band-pass filter 13 which is tuned to the frequency of the tone signal and which is arranged to pass only a very narrow band of frequencies i.e. only sufficient to allow for small variations in the transmitted frequencies. Thus the output of the band-pass filter 13 comprises the tone signal and the noise at that frequency. The output of the band-pass filter 13 is rectified and integrated by the rectifying integrator 17 and the integrated signal is fed to input 21.

Simultaneously the amplified tone signal and noise is fed, in the second signal path, through notch filter 15 which is tuned to the tone signal frequency to pass all signals except those passed by the band-pass filter 13.

The output of the notch filter 15 therefore is, effectively, the total noise. This output is rectified and integrated by the rectifying integrator 18, the output of which is fed to input 22 of the comparator 23.

Before the receiver receives a signal of the rectifying integrator will be continuously integrating the circuit noise and hence input 22 of the comparator will be held at a voltage level, which comprises the reference voltage and the mean integrated noise level, and the comparator does therefore not object. When the receiver receives a signal the level of circuit noise drops, but the comparator will still not output.

The noise level of the received signal and the reference voltage set a threshold voltage at input 22. The tone signal and its associated noise at the passed frequencies are integrated in the first signal path and hence the voltage level at input 21 will rise until it is equal to the voltage level on input 22 at which point the comparator 23 will output. The time which elapses between the receipt of the tone signal and the time of output of comparator, is an indication of the signal/noise ratio in that the time taken for the voltage level at input 21 to rise to the voltage level input 22 is a function of the magnitude of the noise passed by notch filter 15.

This indication of signal/noise can be used in a mobile radio system where a transmitted signal may be available on a number of receivers. The tone/noise signal received by each receiver is fed to an associated one of the signal/noise indication circuit described above. Provided the signal reaches each circuit simultaneously, the first circuit to output will indicate the receiver with the best signal/noise ratio because in each circuit the noise is amplified by the same gain as is the tone signal.

Apparatus can therefore be provided for selecting, whenever a tone signal is transmitted, that receiver which is associated with the first circuit to output. Preferably a tone signal is transmitted, every time a transmitter transmits.

Figure 2:
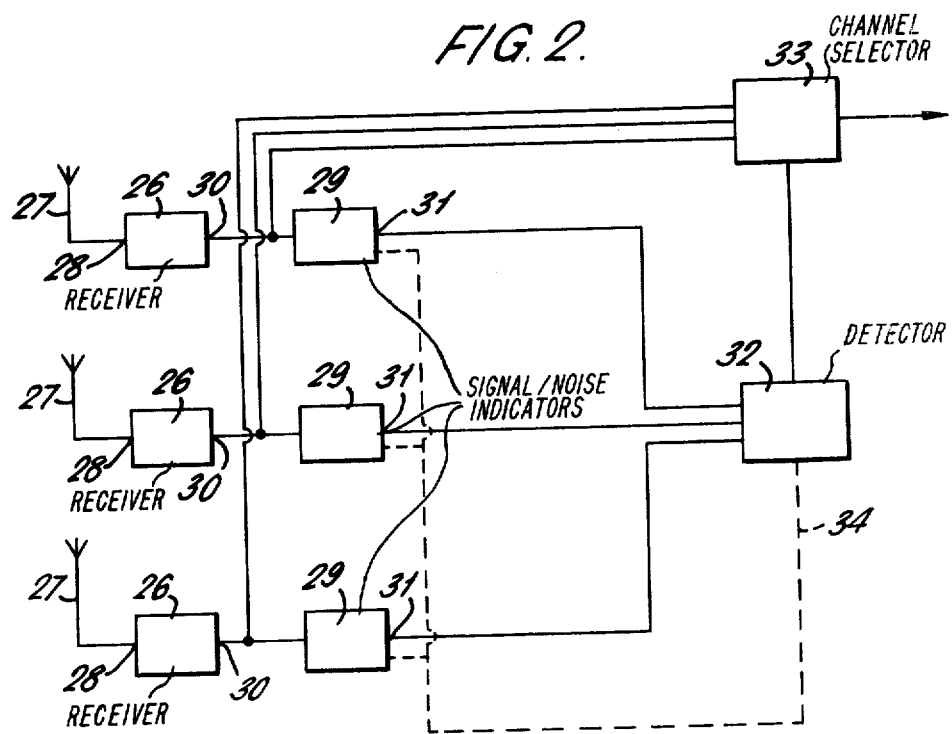
FIG. 2 is a block diagram of a multi-receiver apparatus for use with a mobile radio source.

FIG. 2 is a schematic diagram of a multi-receiver apparatus for use with a mobile radio source.

The apparatus comprises a plurality of receivers 26, each having an aerial 27 connected to an input 28 and a circuit 29 of the type shown in FIG. 1, as described above, connected to an output 30.

The output 31 of each circuit 29 is connected to a detector 32, which detects which circuit 29 is first to output and provides an indication, of which circuit 29 output first, to a channel selector 33 which is connected to outputs 30 and selects the appropriate receiver 26.

In practice, due to the geographical dispersement of the receivers the tone signals do not reach the circuits simultaneously. The lack of simultaneity can be countered either by setting different voltage reference levels in different circuits in accordance with the delay which occurs in the receipt of the tone signal or alternatively the first output by a comparator can be used to clamp and release the filters 13, by dectector 32 sending a pulse signal along line 34, in all of the circuits so that in effect the tone signal reapplied simultaneously, the selection of receiver being made on the basis of the first comparator to output after clamping and release have occurred. The time needed to clamp filters 13 depends on the actual circuits used, but it need only be long enough to clear the filters of any residual oscillations.

As shown in FIG. 3 in order to reduce the number of lines extending between the selecting apparatus and the receivers, a number of signal/noise indication circuits 29 can be arranged in cascade. Each time a channel selector 33 selects a channel it generates a labelling signal identifying the channel from which the signal is taken.

I claim:

1. Apparatus for selecting one of a plurality of receivers receiving a signal from a single source comprising a circuit operatively associated with each receiver for providing an indication of the signal/noise ratio of a single frequency signal as received by its associated receiver, each said circuit comprising:
   input means for accepting the received signal;
   a comparator; and
   first and second signal paths extending between the input means and the comparator, the first signal path including narrow band-pass filter means tuned to the signal frequency and means for integrating the output of the band-pass filter means, the second signal path including notch filter means tuned to the signal frequency and means for integrating the output of the notch filter means, and the comparator including means for providing an output whenever the integrated output on the first signal path is equal to or greater than the integrated output on the second signal path whereby the time that elapses between the receipt of the signal at the input and the beginning of the comparator's output provides an indication of the signal/noise ratio;
   means for detecting which of said circuits produces an output first in response to a received signal; and
   means for selecting the signal receiver associated with the first circuit to produce an output.

2. A circuit as claimed in claim 1 further comprising an amplifier connected in the first and second signal paths between the input means and the filter means for amplifying the received signals to a common level.

3. A circuit as claimed in claim 2 or 1 further comprising means for setting a D.C. voltage level in the second signal path.

4. Apparatus as claimed in claim 1 wherein the means for detecting comprises two or more means for determining which of a respective group of receivers outputs first and further means for determining which of the first mentioned means for determining is first to detect the output.

5. Apparatus as claimed in claim 1 or claim 4 for use with dispersed receivers wherein the detecting means clamps and then releases, in use, all the circuits in response to the detection of the first output and selects the receiver associated with the first circuit to output after the circuits have been clamped and subsequently released.

* * * * *